US006244419B1

(12) United States Patent
Slocum

(10) Patent No.: US 6,244,419 B1
(45) Date of Patent: Jun. 12, 2001

(54) DIVERTER FOR FLAT ARTICLE HANDLING SYSTEM

(75) Inventor: Douglas A. Slocum, New Milford, PA (US)

(73) Assignee: Lockheed Martin Federal Systems, Owego, NY (US)

(*) Notice: Subject to any disclaimer, the term of this patent is extended or adjusted under 35 U.S.C. 154(b) by 0 days.

(21) Appl. No.: 09/383,907

(22) Filed: Aug. 26, 1999

(51) Int. Cl.[7] .................... B65G 47/10

(52) U.S. Cl. .................... 198/369.1; 271/303

(58) Field of Search .................... 198/369.1, 348; 271/303, 305, 273

(56) References Cited

U.S. PATENT DOCUMENTS

| | | | |
|---|---|---|---|
| 4,601,396 | 7/1986 | Pavie | 209/569 |
| 5,150,894 | 9/1992 | Ricciardi | 271/302 |
| 5,358,239 | 10/1994 | Hario et al. | 271/303 |
| 5,649,892 * | 7/1997 | Auerbach | 493/420 |
| 5,655,765 | 8/1997 | Asami et al. | 271/185 |
| 5,833,232 | 11/1998 | Ifkovits et al. | 271/225 |

FOREIGN PATENT DOCUMENTS

| | | | |
|---|---|---|---|
| 64-60559 * | 3/1989 | (JP) | 271/303 |

* cited by examiner

*Primary Examiner*—Kenneth W. Noland
(74) *Attorney, Agent, or Firm*—Wolf, Greenfield & Sacks, P.C.

(57) ABSTRACT

This invention provides an improved diverter for a flat article/mail handling system which diverter includes a conveyor for moving articles through the diverter. A mechanism is preferably provided for minimizing contact between a moving part of the conveyor and a stationary part of a diverter platen. This mechanism may, for example be a bearing surface on the platen in a contact region between a conveyor pinch roller and the platen and/or may be a recess formed in the platen in the regions thereof underlying the conveyor. The bearing may be slightly enlarged so as to raise the pinch roller a very small distance above the surface of the platen, eliminating the need for the groove.

15 Claims, 2 Drawing Sheets

DIVERTER FOR FLAT ARTICLE HANDLING SYSTEM

FIELD OF THE INVENTION

This invention relates to systems for handling flat articles such as mail, and more particularly to an improved diverter for use in such systems.

BACKGROUND OF THE INVENTION

In transport systems for handling mail or other flat articles, there is frequently a need to provide one or more diverter stations, with some of the articles passing through the station undiverted and selected articles being diverted to an alternate transport path or so as to drop into a suitable receptacle at the station. Such diverter stations may, for example, function as sorter stations in a mail handling system.

Such diverters typically utilize a diverter platen or vane over which articles move when the diverter is in a non-divert position. Since in a mail handling system, the articles are normally moving at relatively high speed, the inertia of the articles is generally sufficient to propel them across the diverter without requiring an independent drive on the diverter. However, with no independent drive on the diverter, if the system is turned off for some reason, it is possible for a piece of mail or other article to get hung up on the diverter, creating a jam in the system which must be manually cleared. It is therefore preferable that inertia alone not be relied upon to move articles across the diverter platen.

One solution to this problem is to have the diverter platen be shorter than the articles passing thereacross, or as a minimum of substantially the same length as the shortest article passing thereover, so that by the time the trailing edge of an article leaves the drive mechanism leading into the diverter platen, the leading edge of the article has already been grabbed by the take away mechanism from the platen. However, moderate mail handling systems are required to handle mail pieces which are as small as four or five inches in length, a length shorter than that required for the diverter plate.

A need therefore exists to provide an independent drive for articles passing through a diverter station. However, since the diverter platen itself is preferably a passive platen which performs only the divert function and does not contain a moving drive component, a moving drive component is typically required which would interact with the platen to move articles thereacross. Such a drive component, for example a drive belt, would continue to rotate whether the platen is in its non-divert position where the moving belt/component is used to move articles across the platen or in its tilted, divert position where articles are not driven thereacross. However, in either position, contact between a moving belt/component and a stationary or non-rotating platen would create friction which in turn generates undesired heat in the apparatus, can generate dirt particles as a result of the wear which can interfere with operations of the system and/or stain mail or other articles passing through the apparatus, and most importantly, create wear on both the moving belt/component and the platen, requiring more frequent maintenance and repair for the apparatus, and thus significantly increasing both downtime and operating expense for the system.

While this undesired contact can be eliminated when the platen is in its non-divert position by providing a small spacing between the drive mechanism and platen, in an application such as mail handling where articles as thin as 0.007" must be handled, it is difficult to maintain such close spacing without contact, and this is even more difficult where the articles being handled are of variable thickness, as is generally the case for mail, a typical thickness specification being from 0.007" to 1.25". Such variable thickness pieces are better handled by a biased pinch roller, the bias force being such that the space between the rollers automatically adjusts to handle variable thickness pieces.

One way in which the above problem of handling thin articles, while avoiding contact between the moving component and the platen, might be dealt with is to have the moving component be for example part of a vacuum head spaced a short distance from the platen, the vacuum permitting thin articles to be moved across the divert station without requiring physical contact between the moving component and the platen. However, vacuum is not available at all locations where article sorting is to occur and, even where available, there is frequently limited availability of vacuum. A vacuum head is also more expensive than a moving belt or other component not requiring vacuum and vacuum heads also require more maintenance. Therefore, use of a vacuum head for this application is undesirable. A diverter having an independent drive which meets the performance requirements indicated above without providing friction contact between a moving and stationery surface has not heretofore existed in the art.

SUMMARY OF THE INVENTION

In accordance with the above, this invention provides a diverter for use in a flat article handling system which diverter includes a diverter platen which is normally in a non-divert position, a drive mechanism which selectively moves the diverter platen to a tilted or slanted divert position, and permits return to the non-divert position, and a moving conveyor mounted over the platen for moving flat articles across the surface of the platen when the platen is in the non-divert position. The diverter preferably includes a mechanism for minimizing contact between a moving part of the conveyor and a stationary part of the platen. For preferred embodiments, the conveyor has a roller in at least selective contact with the platen in a contact zone thereof, and preferably in substantially continuous contact with the platen in the contact zone; and for one embodiment, the platen includes a moving bearing surface at the contact zone. The platen is normally wider than the conveyor and the platen may have a recess formed therein in an area of its surface underlying the conveyor, the recess permitting the conveyor to make good contact with thin articles passing over the platen surface without substantial friction contact with the platen when no articles are present. This latter feature may be advantageous even in the absence of a bearing surface. For another embodiment, the bearing surface is slightly above the platen surface, the raised bearing surface acting on the roller of the conveyor to maintain a small spacing between the platen surface and an adjacent surface of the conveyor.

The conveyor generally needs to be moved when the platen is moved to the divert position so as to not interfere with platen movement. A separate drive mechanism may be provided for moving the conveyor or the bearing surface may act on the roller to move the conveyor as the platen is moved by its drive mechanism to the divert position. At least one component may be provided biasing the conveyor to the position it is in when the platen is in its non-divert position, movement of the conveyor for the divert position being against the bias of such component. The platen may also have an underside, articles striking this underside of the platen when the platen is in the divert position and being redirected either to a suitable receptacle or to an alternate transport path.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1A:
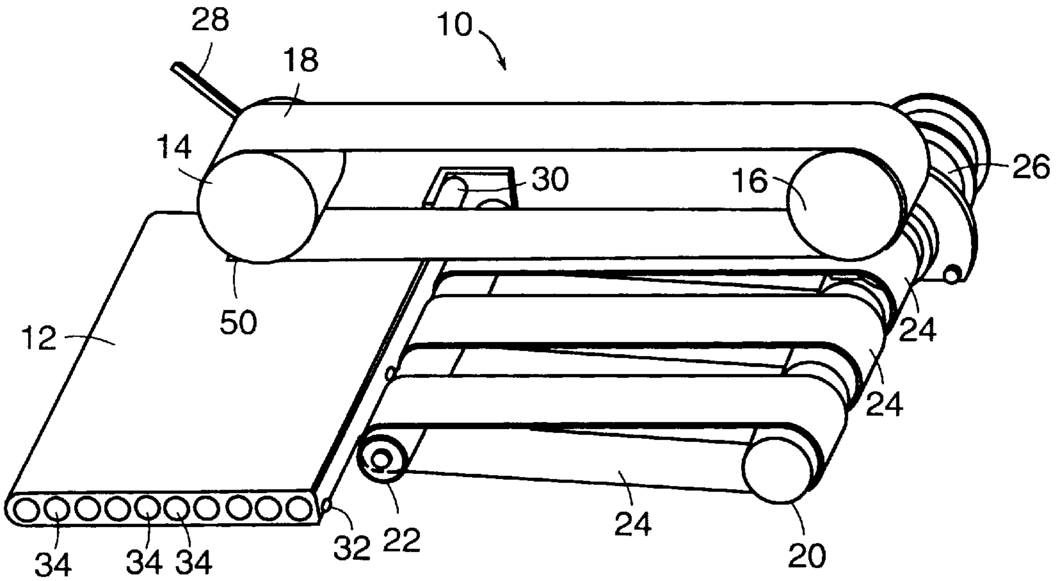
FIGS. 1A and 1B are top front prospective views of a diverter mechanism in accordance with the teachings of this invention in its non-divert and divert positions, respectively.

Referring to the figures, the diverter mechanism 10 includes a diverter platen 12 and a drive mechanism which includes a pinch roller 14, a roller 16 and a belt 18 passing over the rollers. In addition to overlying at least a portion of platen 12, belt 18 also forms part of an article feed mechanism from the diverter which mechanism also includes a driven roller 20, driven by a suitable motor 26, or belt driven pulley, an idler roller 22 and lower belts 24 passing over rollers 20 and 22. Roller 16 may be actively driven, either from motor 16 through suitable gearing or by a separate motor, or roller 16 may be an idler roller driven by contact with roller 20 or a belt 24 thereon.

A spring loaded pivot arm 28 is provided to bias pinch roller 14 against platen 12. Platen 12 is fixedly mounted to a shaft 30, secured through a rear opening in platen 12 by, for example, screws 32. Additional openings 34 may be provided in the platen to reduce its weight. A bias spring on spring loaded pivot arm 36 may also be provided for roller 16 (FIGS. 2A and 2B) to bias the roller against drive roller 20. The pressure applied by springs 28 and 36 is sufficiently low so that flat articles/mail of varying thickness may pass between adjacent rollers.

Figure 1B:
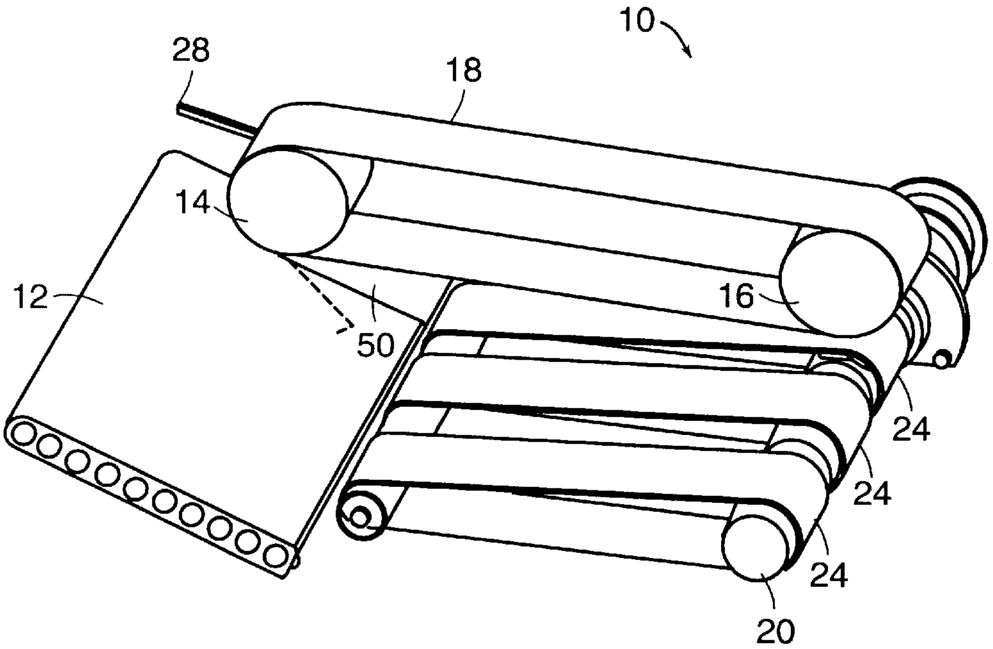
Figure 2A:
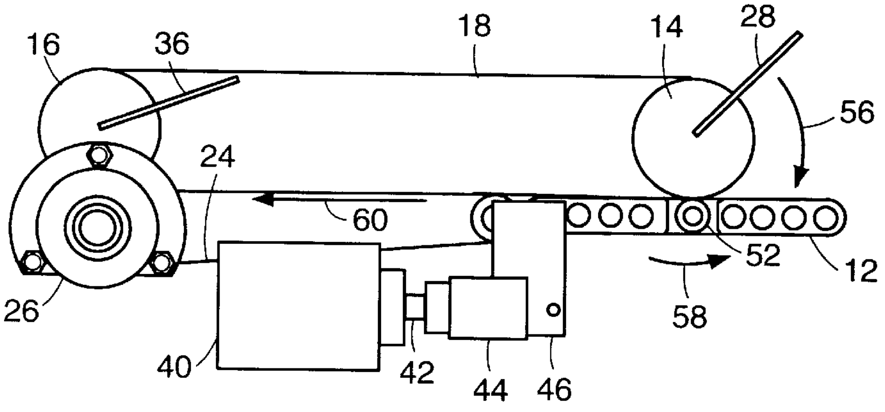
FIGS. 2A and 2B are back elevation views of the diverter mechanism for the embodiment and positions of FIGS. 1A and 1B, respectively.
Figure 2B:
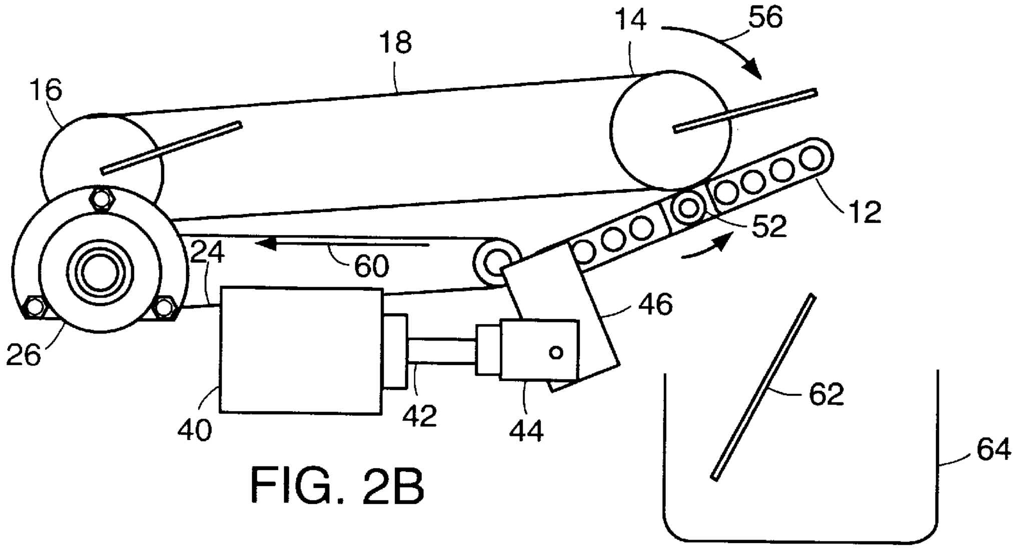

As may be best seen in FIGS. 2A and 2B, a drive mechanism 40 is provided for moving platen 12 between the non-divert position shown in FIGS. 1A, 2A and the divert position shown in FIGS. 1B, 2B. Mechanism 40 may be a solenoid or other suitable electromagnetic/electromechanical component, as it is for preferred embodiments, or may be a hydraulic, pneumatic or other suitable drive component. Component 40 has a drive shaft 42 terminating in a coupler which is pivotally coupled to a link 46. Link 46 is fixedly attached to shaft 30 so that, referring to FIG. 2B, as link 46 is tilted as a result of shaft 42 being extended from drive component 40, platen 12 is correspondingly tilted, and its leading edge raised as shown in the figures.

As may be best seen in FIGS. 1A and 1B, a recess 50 is formed in the top surface of platen 12 for the portion of the platen underlying belt 18. This recess permits belt 18 to be at substantially the surface of platen 12 so as to be able to drive thin mail pieces or other flat articles across the platen without there being physical friction contact between the belt and the platen. Further, as may be best seen in FIGS. 2A and 2B, a rotatable bearing 52 is mounted in platen 12 in the contact zone between pinch roller 14 and the platen so that there is rolling contact rather than friction contact between these components when the pinch roller is in contact with the platen. When the platen is in its straight or horizontal non-divert position as shown in FIGS. 1A and 2A, friction contact can be avoided by, for example, having recess 50 and a stop/limiter on bias spring 28 or otherwise on roller 14 so that, absent an article passing under roller 14, the roller is positioned close to, but slightly spaced from, the bottom of recess 50 so as to avoid friction contact therewith.

However, as may be best seen in FIG. 2B, when platen 12 is moved to its tilted, divert position, the conveyor mechanism, and in particular roller 14 and belt 18, must be moved out of the way to permit the platen to be tilted. While either a separate drive mechanism could be provided for the conveyor to move it substantially concurrently with the movement of platen 12, or an additional linkage could be provided off of driver 40 and shaft 42 to drive the conveyor along with the platen, for the preferred embodiment shown in the figures, bearing surface 52 bears against pinch roller 14 as platen 12 is tilted and, while the platen is in the tilted divert position, it moves and holds the conveyor 14 and 18 out of the way. This movement is against the bias of spring 28. Therefore, when mechanism 40 is operated to return platen 12 to the non-divert position shown in FIGS. 1A and 2A, pinch roller 14, and thus the conveyor mechanism of which it is a part, are returned to the non20 divert position by the action of bias spring 28.

In operation, referring to FIG. 2A, mail/flat articles are driven onto platen 12 from the right by drivers (not shown) to the right of the diverter mechanism, which would for example be a belt/pinch roller mechanism such as that use to take undiverted articles away from the divert station. An article entering the diverter mechanism when the mechanism is in its non-divert position as shown in FIG. 2A is grabbed by pinch roller 14 which rotates in the clockwise direction as shown by arrow 56 and pinched between this roller and bearing surface 52, which rotates in the counterclockwise direction as shown by arrow 58. Variations in thickness of an article arriving at roller 14 may be compensated for by roller 14 rising or falling slightly against the bias force of spring loaded pivot arms 28. Belt 18 continues to move the article across the platen until the article is grabbed by belts 24, the article being carried by belt 18 and belt 24 to be taken from the diverter station as shown by arrow 60. Roller 14 and belt 18 being in recess 50 do not make friction contact with the surface of platen 12, the only contact being between pinch roller 14 and bearing surface 58, which contact is a rolling, non-friction contact.

When an article to be diverted approaches station 10, mechanism 40 is operated to tilt platen 12 as shown in FIG. 2B, this also raising the conveyor mechanism, including pinch roller 14 and belt 18, in the manner previously described. This results in the incoming piece of mail/flat article 62 striking the underside of platen 12 and dropping or otherwise being redirected to a suitable receptacle 64, to a slot leading to a suitable receptacle or to an alternate transport path (i.e., for example to a conveyor belt at an angle to belts 24 leading away from the diverter stations). Once article/mail piece 62 has been diverted, the diverter may either be left in the divert position if the following article is also to be diverted, or mechanism 40 may be operated to return the diverter to its non-divert position if the next article is not to be diverted. The spacing between successive articles is sufficient to permit the diverter to move between its positions between articles. Movement of the diverter mechanism may, for example, be completed in 70 milliseconds for an illustrative embodiment.

Figure 3:
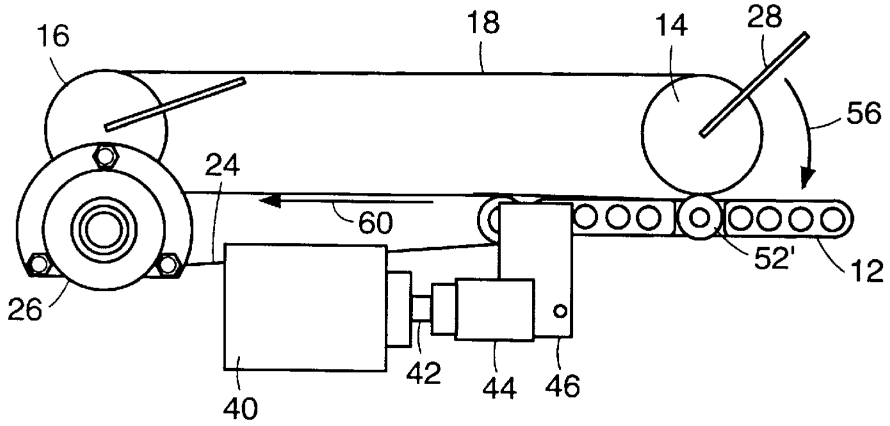
FIG. 3 is a side elevation view for a diverter mechanism of an alternative embodiment in the non-divert position.

FIG. 3 shows an embodiment of the invention which differs from that of FIGS. 1A–2B only in that bearing surface 52' is slightly larger so that it extends a few mils above the upper surface of platen 12. The amount by which bearing surface 52' extends above the surface of the platen will depend on the minimum thickness of articles to be handled. Pinch roller 14 resting on bearing surface 52' thus raises belt 18 slightly above the surface of platen 12, for example less than 0.007" for a mail diverter application (a spacing too small to be visible in FIG. 3) eliminating the need for recess or slot 50 in the platen. Except for this difference, the embodiment of FIG. 3 is identical to that of the earlier embodiment and operates in exactly the same way.

A diverter has thus been shown which facilitates diversion of a flat article by a tiltable platen with a drive/conveyor mechanism for moving the articles through the divert station, but with substantially no friction between the platen and the conveyor mechanism. While two preferred embodiments are disclosed, these embodiments are for purposes of illustration only and many variations are possible in the size, shape, orientation and general configuration of the components, depending upon application. For example, rather than mechanism 40 driving platen 12 back to the horizontal or non-divert position, mechanism 40 could merely release drive force and spring biased arm 28 acting on roller 14, which in turn presses on bearing 52, could function to return the platen. Platen return could also be achieved by other biasing mechanisms or by other techniques. Other drive mechanisms could also be used for tilting the platen. The orientation of the mechanism 10 and of the components thereof may also vary with application. For example, rather than platen 12 and belt 18 being substantially horizontal as shown in the figures when in the non-divert position, these components could be oriented vertically, preferably with articles moving down rather than up, although movement in both directions is possible, or the components may be oriented at substantially any angle between horizontal and vertical. Thus, while the invention has been particularly shown and described above with reference to the preferred embodiments, the foregoing and other changes in form and detail may be made therein by one skilled in the art without departing from the spirit and scope of the invention which is to be defined only by the appended claims.

What is claimed is:

1. A diverter for use in a flat article handling system including:

a diverter platen which is normally in a non-divert position;

a drive mechanism which selectively moves the diverter platen to a divert position and permits return to said non-divert position; and a moving conveyor mounted over said platen for moving flat articles across a surface of the platen when the platen is in the non-divert position, said conveyor having a roller in at least selective contact with said platen in a contact zone thereof, said conveyor being moved when said platen is moved to the divert position so as to not interfere with the platen movement;

said platen including a bearing surface at said contact zone which acts on said roller to move said conveyor as said platen is moved by said drive mechanism to the divert position.

2. A diverter as claimed in claim 1 wherein said platen is wider than said conveyor, said platen having a recess formed therein in an area of said surface underlying said conveyor, whereby said conveyor may make good contact with thin articles passing over said surface without substantial friction contact with the platen.

3. A diverter as claimed in claim 1 wherein said roller is in substantially continuous contact with said bearing surface.

4. A diverter as claimed in claim 3 wherein said bearing surface is slightly above said surface, the raised bearing surface acting on the roller to maintain a small spacing between said surface and an adjacent surface of said-conveyor.

5. A diverter as claimed in claim 1 including at least one component biasing said conveyor to its position when the platen is in the non-divert position, movement of the conveyor for the divert position being against the bias of said component.

6. A diverter as claimed in claim 1 wherein said platen has an underside, articles striking said underside when said platen is in the divert position and being redirected to one of a suitable receptacle and an alternate transport path.

7. A diverter for use in a flat article handling system including:

a diverter platen which is normally in a non-divert position;

a drive mechanism which selectively moves the diverter platen to a tilted divert position and permits return to said non-divert position; and a moving conveyor mounted over said platen for moving flat articles across a surface of the platen when the platen is in the non-divert position, said platen being wider than said conveyor and having a recess formed therein in an area of said surface underlying said conveyor, whereby said conveyor may make good contact with thin articles passing over said surface without substantial friction contact with the platen.

8. A diverter for use in a flat article handling system including:

a diverter platen which is normally in a non-divert position, said platen having an underside;

a drive mechanism which selectively moves the diverter platen to a divert position and permits return to said non-divert position, articles striking said underside when said platen is in the diver position and being redirected to one of a suitable receptacle and an alternate transport path; and a moving conveyor mounted over said platen for coacting with said platen to move flat articles across a surface of the platen when the platen is in the non-divert position.

9. A diverter as claimed in claim 8 including a mechanism for minimizing contact between a moving part of said conveyer and a stationary part of said platen.

10. A diverter as claimed in claim 5 wherein said conveyor has a roller in at least selective contact with said platen in a contact zone thereof.

11. A diverter as claimed in claim 10 wherein said platen includes a bearing surface at said contact zone.

12. A diverter as claimed in claim 11 wherein said bearing surface is slightly above said surface, the raised bearing surface acting on the roller to maintain a small spacing between said surface and an adjacent surface of said conveyor.

13. A diverter as claimed in claim 11 wherein said bearing surface acts on said roller to move said conveyor as said platen is moved by said drive mechanisms to the divert position.

14. A diverter as claimed in claim 13 including at least one component biasing said conveyor to its position when the platen is in the non-divert position, movement of the conveyor for the divert position being against the bias of said component.

15. A diverter as claimed in claim 8 wherein said platen is wider than said conveyor, said platen having a recess formed therein in an area of said surface underlying said conveyor, whereby said conveyor may make good contact with thin articles passing over said surface without substantial friction contact with the platen.

* * * * *